F. N. WHITESELL.
VALVE MECHANISM.
APPLICATION FILED AUG. 3, 1914.
1,166,956.
Patented Jan. 4, 1916.
3 SHEETS—SHEET 3.
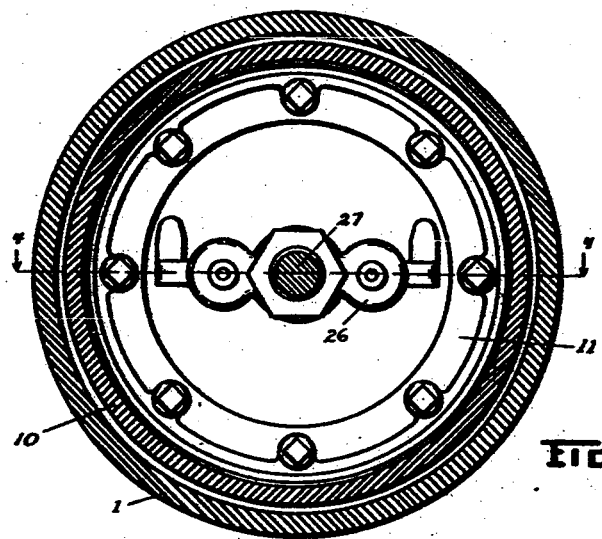
Fig. III.
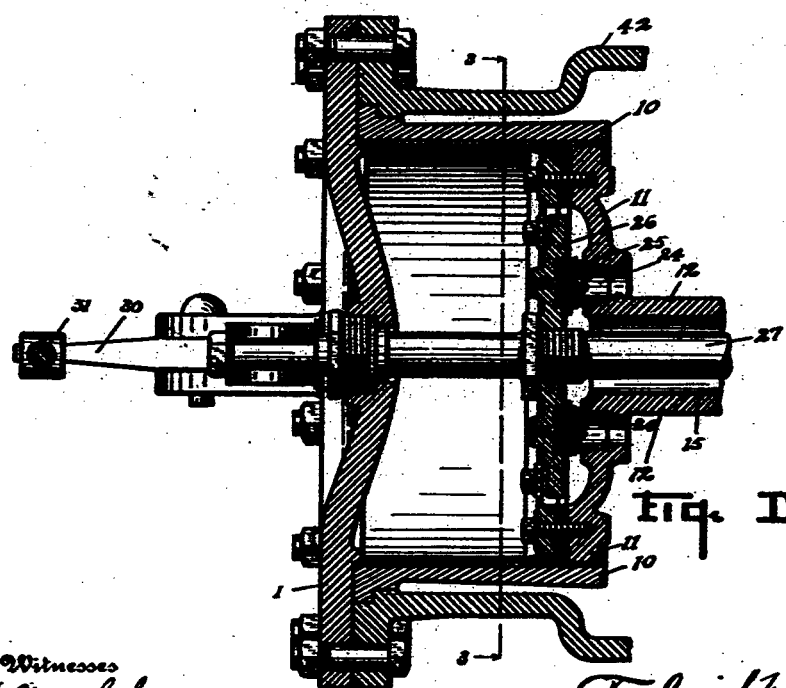
Fig. IV.
Witnesses
M. L. Glasgow.
L. G. Greenfield
Inventor
Frederick N. Whitesell
By Chappell Earl
Attorneys

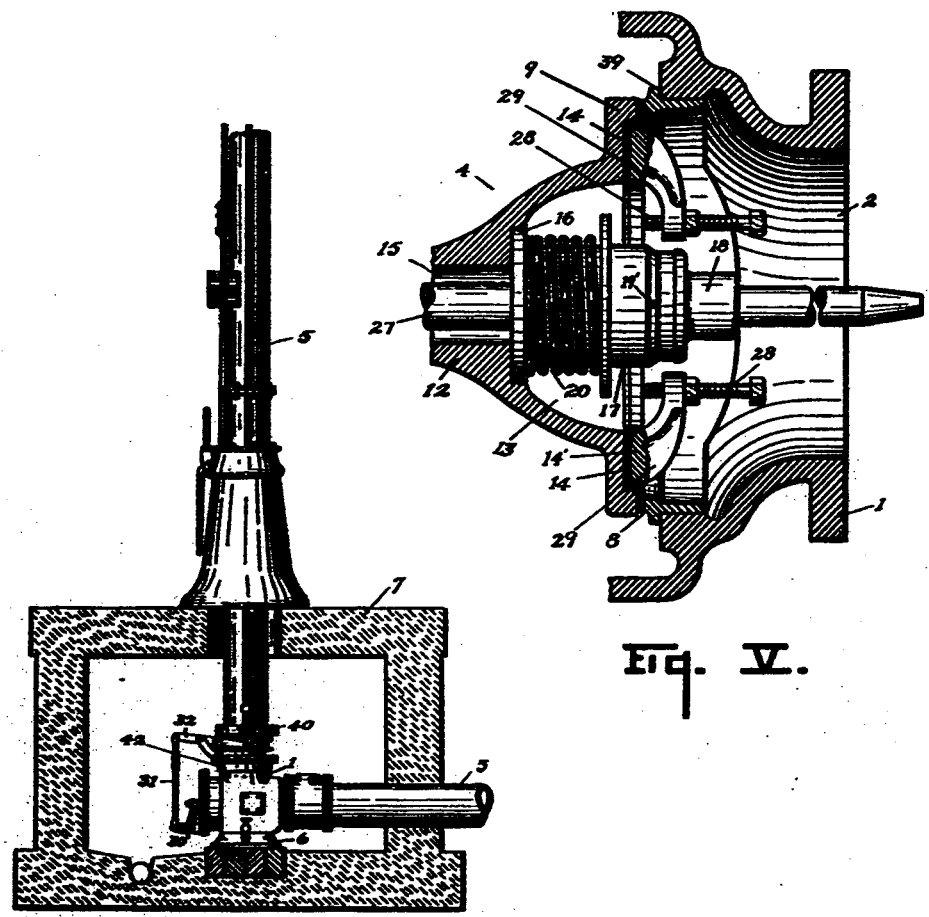

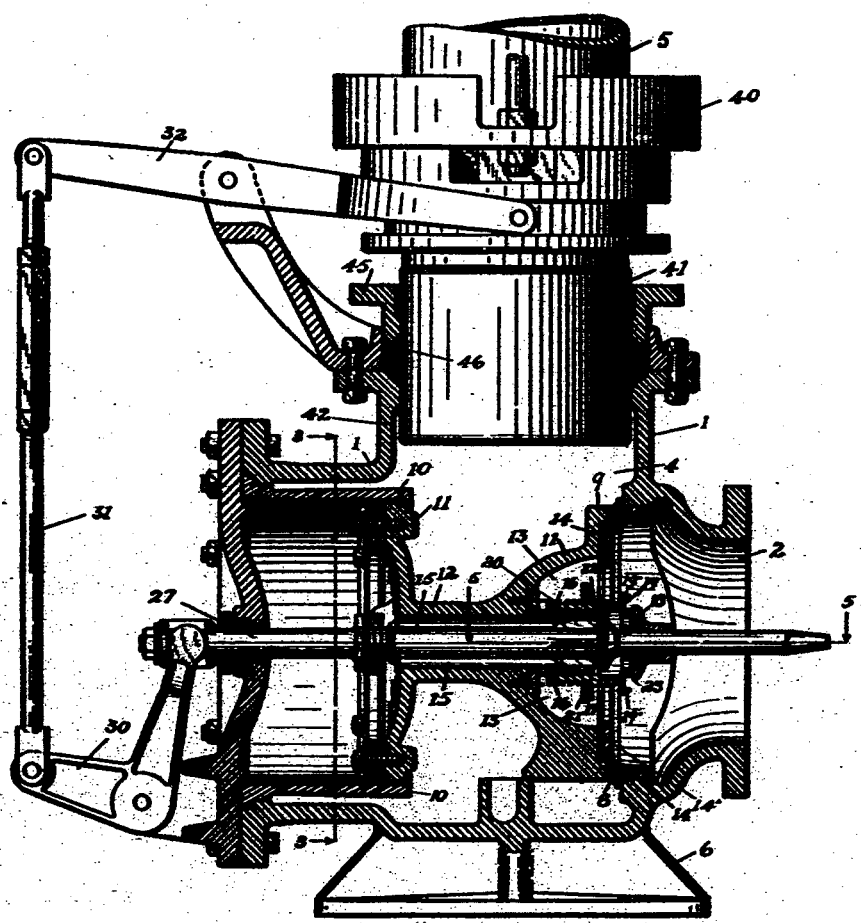
Fig. II.

UNITED STATES PATENT OFFICE.

FREDERICK N. WHITESELL, OF CHICAGO, ILLINOIS, ASSIGNOR TO SHEFFIELD CAR COMPANY, OF THREE RIVERS, MICHIGAN.

VALVE MECHANISM.

1,166,956.  Specification of Letters Patent.  Patented Jan. 4, 1916.

Application filed August 3, 1914. Serial No. 854,653.

*To all whom it may concern:*

Be it known that I, FREDERICK N. WHITESELL, a citizen of the United States, residing at Chicago, Illinois, have invented certain new and useful Improvements in Valve Mechanisms, of which the following is a specification.

This invention relates to improvements in valve mechanisms.

My improved valve mechanism is particularly designed by me for use in stand pipes for locomotives and I have shown the same embodied in a structure of this type, although certain features thereof are adapted and desirable for use in other relations.

The main objects of this invention are: First, to provide an improved valve by which water may be delivered under pressure in large volumes, and one in which "water hammer" is effectively prevented. Second, to provide an improved valve for locomotive stand pipes and the like embodying these improvements which is compact and simple in structure and not likely to get out of repair. Third, to provide an improved valve mechanism embodying these advantages which is simple and easy to operate.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a detail side elevation of a stand pipe structure embodying the features of my invention, a housing for the valve mechanism being shown in conventional form. Fig. II is an enlarged detail view, partially in vertical longitudinal central section through the valve. Fig. III is a cross section on a line corresponding to line 3—3 of Figs. II and IV. Fig. IV is a detail longitudinal section on a line corresponding to line 4—4 of Fig. III, showing details of the piston and exhaust valve. Fig. V is an enlarged detail horizontal section on a line corresponding to line 5—5 of Fig. II.

In the drawing similar reference characters refer to similar parts throughout the several views, and the sectional views are taken looking in the direction of the little arrows at the ends of the section lines.

Referring to the drawing, the valve casing 1 is provided with an inlet 2 which is connected to the supply or main 3 and a discharge 4 which is connected to the stand pipe column 5. The casing 1 is provided with a suitable base 6, and in practise, is commonly placed underground, preferably in a concrete housing, as 7. The valve casing is provided with a valve seat 8 for the main valve 9 which closes toward the inlet 2. Opposite the valve seat 8 is a cylinder 10 for the piston 11. The piston is connected to the main valve barrel portion 12, as shown in Fig. II. The main valve has a packing ring 14 which is retained by the ring 14', the securing means for the ring not being illustrated. The barrel portion 12 is provided with a cylinder supply passage 15, the barrel portion being preferably hollow or tubular as shown. The main valve 9 is provided with a chamber 13 open to the casing inlet 2. The barrel portion 12 is provided with a projection or extension 16 projecting forwardly into the chamber 13. On this projection I mount a tubular or sleeve-like auxiliary valve 17, which coacts with the seat 18 supported centrally, of the main valve seat 8 by a suitable cross piece or spider (not shown) on the valve seat. The valve 17 is provided with a by-pass port 19. The valve 17 is held yieldingly forward by the coiled spring 20, which is mounted on the valve and engages a flange 21 thereon. The extension 16 is provided with a valve seat 22 at its forward end for the control valve on the stem 27, which is disposed within the valve 17. The piston 11 is provided with exhaust ports 24 through which the water from the cylinder escapes to the discharge of the valve casing when the valves 25 are open. These valves 25 are carried by a cross head 26 on the stem 27. The forward position of the valve 17 is controlled by tappets 28, which are in the form of screws carried by the arms 29 on the ring holding member 14'. The valve stem 27 is arranged through a suitable packing in the head of the casing and connected by the bell crank 30 and the link 31 to the lever 32, which is in turn connected to the collar 40 mounted on the column 5 for vertical movement thereon. The details of the stand pipe or column and of the connections for actuating the collar 40 are not shown as they form no part of my present invention. In practice the collar 40 is raised and lowered by the corresponding movement of the operating lever of the stand pipe, not here shown. In the structure illustrated the lower end of the column 41 extends into the port 42 of the valve casing and is provided with a packing ring 46 retained by the gland 45.

The operation of the device is as follows: With the main valve closed as shown the collar 40 is raised which, through the connections described, draws back the valve stem 27 with cross head 26 and valves 25, closing the control valve on stem 27, thereby cutting off the water from the cylinder and opening the exhaust ports. This opening of the exhaust ports 24 allows the water to flow from the cylinder and the pressure on the main valve 9 opens the main valve, allowing the water to pass to the column. As the main valve opens the auxiliary valve is released forward and held by the tappets 28, as described.

When it is desired to close the main valve the collar 40 is lowered which, through the connections described, moves forward the valve stem 27 with cross head 26 and valves 25, closing the exhaust ports 24 and opening the control valve on stem 27. The water flows through the open auxiliary valve 17 and the passage 15 to the piston cylinder, and as the area of the piston 11 is greater than that of the main valve, the main valve is moved toward its seat. The auxiliary valve 17 being held yieldingly forward by the spring 20 seats prior to the seating of the main valve, cutting off the water passing to the cylinder, except such as passes the by-pass port 19, which is regulated by the valve 19'. This, by controlling the water passing to the cylinder, causes the valve 9 to seat slowly and the result is that "water hammer" is prevented.

The structure is simple, compact and durable, and at the same time, very efficient.

I have illustrated and described my improved valve mechanism in detail in the form in which I have embodied the same. I have not attempted to illustrate or describe the various modifications which I contemplate, as I believe the disclosure made will enable those skilled in the art to which this invention relates to embody or adapt the same as conditions may require. I desire, however, to be understood as claiming my improvements specifically in the form illustrated as well as broadly within the scope of the appended claims.

Having thus described my invention, what I claim as new and desire to secure by Letters Patent, is:

1. The combination of a valve casing provided with a main valve seat and an auxiliary valve seat disposed centrally of the main valve seat, a cylinder, a piston having an exhaust port therein, a main valve having a chamber therein open to the casing inlet, a barrel connecting said main valve and piston having a cylinder supply passage therein and provided with an extension projecting into said chamber in said main valve, said extension having a control valve seat therein, a tubular auxiliary valve slidably mounted on said extension to coact with said auxiliary valve seat, said auxiliary valve being provided with a by-pass, an adjusting valve for said by-pass, a spring yieldingly supporting said auxiliary valve, a tappet for said auxiliary valve carried by said main valve and disposed to permit said auxiliary valve to seat prior to the seating of said main valve, a control valve for said cylinder supply passage coacting with said control valve seat, a stem therefor arranged through said main valve barrel, and an exhaust valve mounted on said control valve stem to coact with said exhaust port, said exhaust valve being opened by the closing of the control valve and vice versa.

2. The combination of a valve casing provided with a main valve seat and an auxiliary valve seat disposed centrally of the main valve seat, a cylinder, a piston having an exhaust port therein, a main valve having a chamber therein open to the casing inlet, a barrel connecting said main valve and piston having a cylinder supply passage therein and provided with an extension projecting into said chamber in said main valve, said extension having a control valve seat therein, a tubular auxiliary valve slidably mounted on said extension to coact with said auxiliary valve seat, said auxiliary valve being provided with a by-pass, a spring yieldingly supporting said auxiliary valve, a tappet for said auxiliary valve carried by said main valve and disposed to permit said auxiliary valve to seat prior to the seating of said main valve, a control valve for said cylinder supply passage coacting with said control valve seat, a stem therefor arranged through said main valve barrel, and an exhaust valve mounted on said control valve stem to coact with said exhaust port, said exhaust valve being opened by the closing of the control valve and vice versa.

3. The combination of a valve casing provided with a main valve seat and an auxiliary valve seat disposed centrally of the main valve seat, a cylinder, a piston having an exhaust port therein, a main valve having a chamber therein open to the casing inlet, a barrel connecting said main valve and piston having a cylinder supply passage therein and provided with an extension projecting into said chamber in said main valve, said extension having a control valve seat therein, a tubular auxiliary valve slidably mounted on said extension and adapted to seat on said auxiliary valve seat prior to the seating of said main valve, said auxiliary valve being provided with a by-pass, an adjusting valve for said by-pass, a control valve for said cylinder supply passage coacting with said control valve seat, a stem therefor arranged through said main valve barrel, and an exhaust valve mounted on said control valve stem to coact with said exhaust port, said exhaust valve being opened by the closing of the control valve and vice versa.

4. The combination of a valve casing provided with a main valve seat and an auxiliary valve seat disposed centrally of the main valve seat, a cylinder, a piston having an exhaust port therein, a main valve having a chamber therein open to the casing inlet, a barrel connecting said main valve and piston having a cylinder supply passage therein and provided with an extension projecting into said chamber in said main valve, said extension having a control valve seat therein, a tubular auxiliary valve slidably mounted on said extension and adapted to seat on said auxiliary valve seat prior to the seating of said main valve, said auxiliary valve being provided with a by-pass, a control valve for said cylinder supply passage coacting with said control valve seat, a stem therefor arranged through said main valve barrel, and an exhaust valve mounted on said control valve stem to coact with said exhaust port, said exhaust valve being opened by the closing of the control valve and vice versa.

5. The combination of a main valve, a cylinder, a piston having an exhaust port therein, a barrel connecting said main valve and piston having a cylinder supply passage therein, and an extension having a control seat therein, a tubular auxiliary valve slidably mounted on said extension, said auxiliary valve being provided with a by-pass, an adjusting valve for said by-pass, a spring yieldingly supporting said auxiliary valve, a tappet for said auxiliary valve carried by said main valve and disposed to permit said auxiliary valve to seat prior to the seating of said main valve, a control valve for said cylinder supply passage coacting with said control valve seat, a stem therefor arranged through said main valve barrel, and an exhaust valve mounted on said control valve stem to coact with said exhaust port said exhaust valve being opened by the closing of the control valve and vice versa.

6. The combination of a main valve, a cylinder, a piston having an exhaust port therein, a barrel connecting said main valve and piston having a cylinder supply passage therein, and an extension having a control valve seat therein, a tubular auxiliary valve slidably mounted on said extension, said auxiliary valve being provided with a by-pass, a spring yieldingly supporting said auxiliary valve, a tappet for said auxiliary valve carried by said main valve and disposed to permit said auxiliary valve to seat prior to the seating of said main valve, a control valve for said cylinder supply passage coacting with said control valve seat, a stem therefor arranged through said main valve barrel, and an exhaust valve mounted on said control valve stem to coact with said exhaust port, said exhaust valve being opened by the closing of the control valve and vice versa.

7. The combination of a main valve, a cylinder, a piston connected thereto, connections for delivering water to said cylinder comprising a tubular auxiliary valve slidably mounted on the main valve, a spring yieldingly supporting said auxiliary valve, a tappet for said auxiliary valve carried by said main valve and adapted to permit the auxiliary valve to seat prior to the seating of the main valve, a by-pass for said auxiliary valve, a control valve disposed within said auxiliary valve to control the delivery of water to said cylinder, a stem for said control valve, and an exhaust valve for said cylinder carried by said stem.

8. The combination of a main valve, a cylinder, a piston connected thereto, connections for delivering water to said cylinder, comprising a tubular auxiliary valve, and adapted to seat prior to the seating of the main valve, a by-pass for said auxiliary valve, a control valve disposed within said auxiliary valve to control the delivery of water to said cylinder, a stem for said control valve, and an exhaust valve for said cylinder carried by said stem.

9. The combination of a main valve, a cylinder, a piston connected to said main valve, connections for delivering water to said cylinder comprising an auxiliary valve movably mounted on said main valve, a spring acting on said auxiliary valve for holding it yieldingly forward whereby it is adapted to seat prior to the seating of the main valve, a by-pass for said auxiliary valve, a control valve disposed in said delivery connections, an exhaust valve for said cylinder, and operating connections for said control and exhaust valves whereby the exhaust valve is opened on the closing of the control valve and vice versa.

10. The combination of a main valve, a cylinder, a piston connected to said main valve, connections for delivering water to said cylinder comprising an auxiliary valve movably mounted on said main valve, a spring acting on said auxiliary valve for holding it yieldingly forward whereby it is adapted to seat prior to the seating of the main valve, a by-pass for said auxiliary valve, a control valve disposed in said delivery connections, and an exhaust valve for said cylinder.

In witness whereof, I have hereunto set my hand and seal in the presence of two witnesses.

FREDERICK N. WHITESELL. [L. S.]

Witnesses:
G. E. THOMPSON,
GEO. W. LEWIS.

Copies of this patent may be obtained for five cents each, by addressing the "Commissioner of Patents, Washington, D. C."